UNITED STATES PATENT OFFICE.

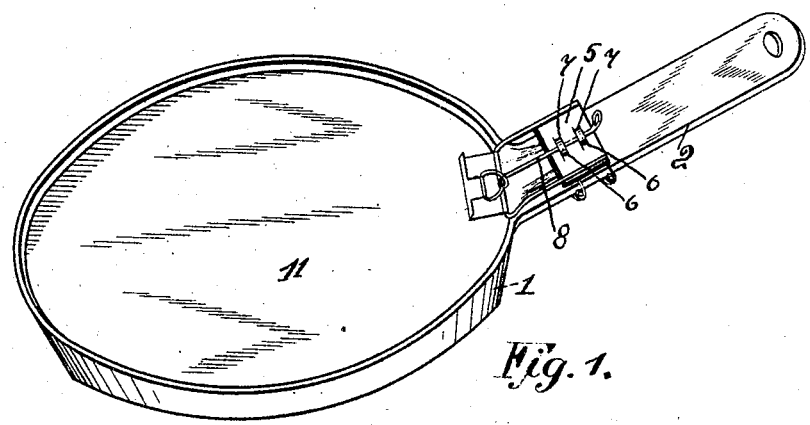

WILLIAM SOWERBY, OF INDIANA, PENNSYLVANIA.

ATTACHMENT FOR CULINARY VESSELS.

No. 810,817.  Specification of Letters Patent.  Patented Jan. 23, 1906.

Application filed March 23, 1905. Serial No. 251,575.

*To all whom it may concern:*

Be it known that I, WILLIAM SOWERBY, a citizen of the United States of America, residing at Indiana, in the county of Indiana and State of Pennsylvania, have invented certain new and useful Improvements in Attachments for Culinary Vessels, of which the following is a specification, reference being had therein to the accompanying drawings.

This invention relates to certain new and useful improvements in attachments for culinary vessels; and the invention relates particularly to means for opening and closing the lids of culinary vessels.

The invention has for its object the provision of novel means for raising and lowering the lid of a culinary vessel, such as a skillet, and to this end I have constructed a detachable device which is adapted to be secured to the handle of a skillet, and by the employment of this device I have devised novel means for hinging a lid independent of the vessel in connection with which it is used and have also provided means in connection with the device whereby after it has been clamped upon the handle of a vessel the lid which it supports can be easily and quickly raised and lowered.

A still further object of this invention is to provide a device of the above-described character which will be extremely simple in construction, strong and durable, and comparatively inexpensive to manufacture.

With the above and other objects in view the invention finally consists in the novel construction, combination, and arrangement of parts, which will be hereinafter more fully described and then specifically pointed out in the claims, and, referring to the drawings accompanying this application, like numerals of reference designate corresponding parts throughout the several views, in which—

Figure 1 is a perspective view of a skillet equipped with my improved attachment. Fig. 2 is a side elevation view of the same. Fig. 3 is a fragmentary top plan view of my improved attachment. Fig. 4 is a bottom plan view of the same, and Fig. 5 is an edge view of a portion of the attachment which comprises a clamp.

In the accompanying drawings I have illustrated the attachment as applied to a culinary vessel, such as a skillet, and I have illustrated a conventional form of skillet consisting of a receptacle 1, carrying a handle 2.

My improved attachment consists of a clamp member preferably constructed of wire. I preferably construct the clamp of wire in order to provide spring-arms, which will engage the upper and lower surfaces of the handle 2. The clamp is clearly illustrated in Figs. 4 and 5 of the drawings, and by referring to said figures it will be observed that the piece of wire is bent, as indicated at 3, to form an arm adapted to engage the underneath surface of the handle 2, while the ends of the wire are bent in a plane parallel to the arm, as indicated at 4 4, forming arms which are adapted to engage the top surface of the handle 2. The formation of the upper and lower arms causes a sufficient resiliency to exist which will insure a positive gripping of the clamp upon the handle. The arms 4 4 are provided with a plate 5, which may be secured to the arms by any desired means, preferably solder. This plate is sheared, as indicated at 6 6, and the straps formed by the shearing of the plate are bent upwardly out of the plane of the plate 5 to form brackets 7 7, in which a rod 8 is mounted.

The plate 5 has secured to its edges by any desired means, preferably solder, the ends 9 9 of a wire which is bent to form a substantially U-shaped strap 10. A lid 11 is hinged to the strap 10 by a plate 12, secured at one edge of the lid 11. The one edge of the plate 12 is rolled, as indicated at 14, to embrace the strap 10, and the opposite edge of the plate is sheared, as indicated at 15, and then rolled to form a sleeve 16. The one end of the rod 8 is passed through the sleeve 16 and then secured to its body portion, as indicated at 17, while the opposite end of the rod 8 is bent upwardly to form a handle 18.

When providing skillets or the like culinary vessels with my improved attachment, I secure the clamp of the attachment in close proximity to the receptacle of the vessel, whereby the lid 11 will fit snugly and evenly within the receptacle 1. To open and close the lid 11 of the skillet, it is only necessary to reciprocate the rod 8 within the brackets 7 7, a rearward movement of the rod 8 opening the lid and a forward movement closing the lid, the sleeve 16 serving functionally as a hinge connection between the lid and the rod 8.

My improved attachment dispenses with the discomfiture experienced by persons handling the skillet when the same is being heated upon a stove and it is necessary to remove the lid. Heretofore it has been necessary to use a culinary instrument, lifter, or dish-cloth to remove the lid, and by the use of my improved attachment these articles are dispensed with and the lid can be opened or closed without the party performing such operation being burned by the heated lid.

It will be noted that various changes may be made in the details of construction without departing from the general spirit and scope of the invention.

What I claim, and desire to secure by Letters Patent, is—

1. An attachment for culinary vessels having handles comprising a spring-clamp formed of wire and adapted to engage the handle of the vessel, a plate carried by said clamp, said plate being sheared to form brackets, a strap carried by said plate, a lid hinged to said strap, a rod mounted in said brackets and connected to said lid, the one end of said rod being bent upwardly to form a handle, substantially as described.

2. In an attachment of the character described, the combination with a culinary vessel having a handle and a lid, of a spring-clamp adapted to embrace said handle, a strap carried by said clamp to which said lid is hinged, a reciprocating rod mounted upon said clamp and connected to said lid.

3. An attachment for culinary vessels comprising a clamp composed of spring-wire having a U-shaped arm adapted to engage the underneath surface of a handle and having arms parallel to said U-shaped arm and connected thereto by a coil, a plate carried by said last-named arms, a strap carried by said plate, a lid hinged to said strap and a reciprocating rod, slidably mounted on brackets carried by said plate, and pivotally connected to the said lid.

In testimony whereof I affix my signature in the presence of two witnesses.

WILLIAM SOWERBY.

Witnesses:
JOHN R. RICHARDS,
L. F. SUTTER.